(12) United States Patent
Karpinsky et al.

(10) Patent No.: US 7,757,836 B2
(45) Date of Patent: Jul. 20, 2010

(54) FOOD COATING AND TOPPING APPLICATOR APPARATUS AND METHODS OF USE THEREOF

(75) Inventors: James Karpinsky, Poynette, WI (US); James Bakos, Poynette, WI (US); Scott Rose, Columbus, WI (US); Travis Renkly, Volga, SD (US)

(73) Assignee: Vibratory Solutions, LLC, Lodi, WI (US)

( * ) Notice: Subject to any disclaimer, the term of this patent is extended or adjusted under 35 U.S.C. 154(b) by 109 days.

(21) Appl. No.: 12/126,610

(22) Filed: May 23, 2008

(65) Prior Publication Data

US 2008/0283366 A1 Nov. 20, 2008

Related U.S. Application Data

(63) Continuation-in-part of application No. 11/396,202, filed on Mar. 30, 2006.

(60) Provisional application No. 60/940,247, filed on May 25, 2007, provisional application No. 60/667,405, filed on Apr. 1, 2005.

(51) Int. Cl.
*B65G 27/06* (2006.01)

(52) U.S. Cl. ................... 198/758; 198/752.1; 198/848

(58) Field of Classification Search ............. 198/752.1, 198/758, 759, 763, 766, 848; 118/22, 24; 99/494, 450.1
See application file for complete search history.

(56) References Cited

U.S. PATENT DOCUMENTS

| | | | |
|---|---|---|---|
| 580,644 A | 4/1897 | Ham | |
| 2,659,338 A | 11/1953 | Harrison | |
| 3,245,518 A | 4/1966 | Reibel et al. | |
| 3,707,769 A | 1/1973 | Syrjanen et al. | |
| 4,248,173 A | 2/1981 | Kuhlman | |
| 4,313,535 A | 2/1982 | Carmichael | |
| 4,889,241 A | 12/1989 | Cogan et al. | |
| 4,936,248 A | 6/1990 | Miller | |
| 5,052,330 A | 10/1991 | Stacy | |
| 5,150,798 A | 9/1992 | Mills, Jr. | |
| 5,238,303 A | 8/1993 | Dixon | |
| 5,238,493 A | 8/1993 | Miller | |

(Continued)

OTHER PUBLICATIONS

Robins Vibro Batter and Breading Machine, Robins Food Processing Machinery, A.K. Robins and Company, Incorporated, p. 230.

(Continued)

*Primary Examiner*—James R Bidwell
(74) *Attorney, Agent, or Firm*—Whyte Hirschboeck Dudek S.C.

(57) ABSTRACT

Apparatuses and methods for coating, topping, and conveying foods. The apparatus includes a first frame, spring assemblies, a vibrating assembly including an upper pan, a middle pan, a lower pan, and a second frame mounted to the lower pan with the spring assemblies. The second frame is an excited frame and the upper pan, the middle pan, the lower pan are vibrationally connected. The apparatus also includes a vibratory drive unit mounted and adapted to impart energy to the second frame. In addition, the apparatus has a wire conveyor belt assembly including a wire conveyor belt, and a housing that receives the wire conveyor belt. The wire conveyor belt assembly is suspended inside of the vibratory assembly by the first frame such that the wire conveyor belt assembly is isolated from the vibratory assembly.

5 Claims, 15 Drawing Sheets

U.S. PATENT DOCUMENTS

| | | | |
|---|---|---|---|
| 5,267,672 A | 12/1993 | Jacobsen et al. | |
| 5,555,967 A | 9/1996 | Hufford | |
| 5,643,361 A | 7/1997 | Wadell | |
| 5,728,216 A | 3/1998 | London | |
| 5,762,176 A | 6/1998 | Patterson et al. | |
| 5,868,241 A | 2/1999 | Pellegrino | |
| 5,908,117 A | 6/1999 | Stroman et al. | |
| 6,000,320 A | 12/1999 | Herrick, IV | |
| 6,019,216 A | 2/2000 | Patterson | |
| 6,079,550 A | 6/2000 | Gilman | |
| 6,079,698 A | 6/2000 | Patterson et al. | |
| 6,117,235 A | 9/2000 | Toccaceli et al. | |
| 6,142,292 A | 11/2000 | Patterson | |
| 6,161,680 A | 12/2000 | Martin et al. | |
| 6,179,117 B1 | 1/2001 | Gilamn | |
| D443,501 S | 6/2001 | Sleppy | |
| 6,250,471 B1 * | 6/2001 | Ruthven et al. | 198/766 |
| 6,253,908 B1 | 7/2001 | Gilman | |
| 6,279,731 B1 | 8/2001 | Anderson | |
| 6,286,658 B1 | 9/2001 | Hufford | |
| 6,308,822 B1 | 10/2001 | Moran et al. | |
| 6,325,202 B1 | 12/2001 | Gaines | |
| 6,415,913 B2 | 7/2002 | Sleppy et al. | |
| 6,457,577 B1 | 10/2002 | Ikieda et al. | |
| 6,460,680 B1 | 10/2002 | Hufford | |
| 6,486,481 B1 | 11/2002 | Tigera | |
| 6,631,799 B2 * | 10/2003 | Samson | 198/443 |
| 6,655,523 B2 | 12/2003 | Jones et al. | |
| 6,659,267 B2 | 12/2003 | Patterson | |
| 6,705,459 B1 | 3/2004 | Musschoot | |
| 6,834,756 B2 | 12/2004 | Sullivan, Jr. | |
| 6,868,960 B2 | 3/2005 | Jones | |
| 6,962,128 B2 | 11/2005 | Dove et al. | |
| 7,174,846 B2 | 2/2007 | Martinus et al. | |
| 2001/0051538 A1 * | 12/2001 | Suzuki et al. | 198/758 |
| 2002/0175051 A1 * | 11/2002 | Samson | 198/750.2 |
| 2003/0041746 A1 | 3/2003 | Schmidt | |
| 2006/0156931 A1 | 7/2006 | Mather et al. | |

OTHER PUBLICATIONS

MP Equipment Company, Brochure, "MP Drum Breader"; http://www.mpequipment.com/products/breader_drum.html.

Meyer + Garroutte Systems, Brochure, Garroutte Closed Pocket Elevator, "Unique Conveyor Meters Product with No Spilling,"; www.meyer-industries.com.

Marchant Schmidt, Inc. Products>Products Topping Applicators. "Topping Applicator"; http://www.marchantschmidt.com/item_detail.php?id-64.

Stein Associates, Inc., Brochure, "XL Breading Machine" SP-0471-986.

Composiflex, Brochure, "Composite Springs"; www.composiflex.com.

P.J. Prause Durotec GmbH, Brochure, "Fatigue strength of S-PLY leaf springs".

Renold Ajax, Brochure, "Rotart Electric Vibrators".

Volta Belting Technology Ltd., Brochure, "SuperDrive, The Hygienic Positive-Drive Belt".

Intralox, Brochure, "Series 800".

"A composite housing with integrated performance features".

"How to select the right overhung load adaptors".

Flat-Flex, Brochure, "Mesh guide".

Eaton, Brochure, "Low speed high torque motors", Aug. 2006.

Non-final office action mailed May 28, 2009 for U.S. Appl. No. 11/396,202, filed Mar. 30, 2006.

Notice of Allowance mailed Dec. 16, 2009, for U.S. Appl. No. 11/396,202, filed Mar. 30, 2006.

* cited by examiner

FOOD COATING AND TOPPING APPLICATOR APPARATUS AND METHODS OF USE THEREOF

CROSS-REFERENCE TO RELATED APPLICATIONS

This application claims priority under 35 U.S.C. §119(e) to U.S. Provisional Patent Application No. 60/940,247, filed May 25, 2007, and under 35 U.S.C. §120 to and is a continuation-in-part of U.S. patent application Ser. No. 11/396,202, filed Mar. 30, 2006 and claiming priority to U.S. Provisional Application Ser. No. 60/667,405 filed on Apr. 1, 2005, the entireties of both of which are incorporated by reference herein.

FIELD OF THE INVENTION

The field of invention includes food coating, food topping, and food conveying equipment.

BACKGROUND OF THE INVENTION

Prepared food products come in a wide variety of styles. Many prepared food products, whether ready-to-eat or those needing further cooking, are prepared with a coating that makes the food product more appealing. Such prepared food products include entrees, appetizers, desserts (such as pastries, donuts), etc., and includes meats, cheese, fruit and vegetables, etc. The types of coatings used on these food products include dry coatings such as flour, bread crumbs, corn meal, sugar and spice and the like. While the automation of the food coating process is economically desirable, another goal of the food coating process is to make the coating appear to be "home-made." However, most automatic food coating processes fail to make "home-style" appearing foods.

Prepared food products also include foods having one or more topping applied to one or more sides of the food product. Such prepared food products include pizzas, pretzels, fish or other meat patties, and the like. The types of toppings used on these food products include cheese, mushrooms, sausage, sugar and cinnamon, spices, breadings, salt, and the like.

Some food products have a batter applied to them before the coating or topping is applied. When a batter applicator is used before the coating or topping is applied, time is saved when both the batter applicator and the coating or topping run at the same or similar speed. This provides a continuous flow of food product during both processes.

In the commercial production of prepared foods, a large variety of food products are machine-coated with breading, flour or the like before being fried, (or otherwise cooked) or simply frozen and packaged. In the food preparation industry, food coatings are generally classified by appearance as flour breading, free flowing (such as cracker meal or bread crumbs), and Japanese-style crumbs which tend to be elongate and crispy. Food coatings may also include seasonings, spices, shortening, etc., as needed to add flavor and texture to the food product. Other coatings such as ground cereal, dried vegetables or the like may also be employed.

Each coating mixture has inherent characteristics that presents challenges to machinery used to automatically and mechanically coat food products. For example, flour mixtures, which consist of finely ground dust-like particles, have a tendency to pack under pressure thereby decreasing the free-flow properties of the coating mixture around the food product, which can decrease coating uniformity. Similarly, coating mixtures recognized as free-flowing include reasonably hard and roughly spherical particles ranging in size from dust to larger particles, such as cornmeal, cracker meal or the like. Free-flowing mixtures in automated coating processes can often flow or leak out of the machinery.

Japanese-style crumbs have no uniform shape, are very delicate, and are crystalline-like in nature and appearance. So, the coating machine should be able to properly handle this type of breading material to avoid degradation of the quality and particle sizes thereof. Japanese-style crumbs consist of modified wheat flour with small percentages of yeast, salt, sugar, vegetable oil and other additives. The Japanese style crumbs appear to be dried shredded white bread having particles ranging in size from as large as ½ inch to as small as flour size particles.

Generally, the food industry prefers to use an automated and continuous food coating process wherever possible while still achieving a "home-style" look. Continuous processes include: tumble drums and mesh belt processes. The tumble drum operation has a hollow drum or tumbling device that is fed with a coating mixture and food products, and it is rotated so that the food product is tumbled in the coating in a manner which causes the coating material to contact and adhere to the outer surfaces of the food. After a sufficient contacting time (generally determined by the size, speed of rotation and internal drum structure) the food items are discharged for further processing.

The drum coating also has its drawbacks. Principally, mechanical handling of the food items may be quite rigorous limiting its use to robust products. More delicate food items (such as fish) may not be suitable for drum processing.

Other types of food coating devices employ endless mesh belts. For example, U.S. Pat. No. 6,117,235 discloses a continuous coating and breading apparatus which includes a conveyor belt made of stainless steel mesh. The conveyor has various stations along its length. Food items are deposited on the belt at an infeed area and are coated with the coating mixture on the bottom surface. The conveyor belt carries the food items under a "waterfall" of food coating that covers the top surface of the food items. The conveyor passes under one or more pressure rolls that pat the coating mixture onto the food pieces, and/or a blow off device, removing excess coating. The coated food product is deposited at a discharge area. In commercial practice, such systems may employ as many as six conveying belts to spread the coating mixture and achieve acceptable consistent operation and performance.

Other types of food coating devices use multiple augers to distribute coatings and/or toppings to various parts of the device. Oftentimes, six or more augers or other conveying devices are used to spread coatings and/or toppings. This results in a complex device with numerous drives. These types of devices are also difficult to clean. Furthermore, augers degrade coatings and toppings, and are dangerous.

A breading machine was available from A. K. Robins and Company, Baltimore, Md. The machine was marketed as the Robins Vibro Batter and Breading Machine. As shown in FIG. 1546-5 of the product literature, the vibrator was mounted directly to the coating pan. The coating pan was mounted to a frame using springs. The frame was mounted to the floor and was operated at a very high amplitude and low frequency.

The present invention overcomes at least some of the disadvantages associated with the prior machines by providing an excited frame and pan assembly capable of dramatically improved coating of a wide range of food items at relatively high frequency and low amplitude.

The present invention overcomes at least some of the disadvantages associated with the prior machines by providing an excited frame and pan assembly along with a wire belt conveyor that conveys food product.

BRIEF DESCRIPTION OF THE DRAWINGS OF THE PREFERRED EMBODIMENTS

DETAILED DESCRIPTION OF THE PREFERRED EMBODIMENT

Construction and Operation of a First Preferred Embodiment

Figure 1:
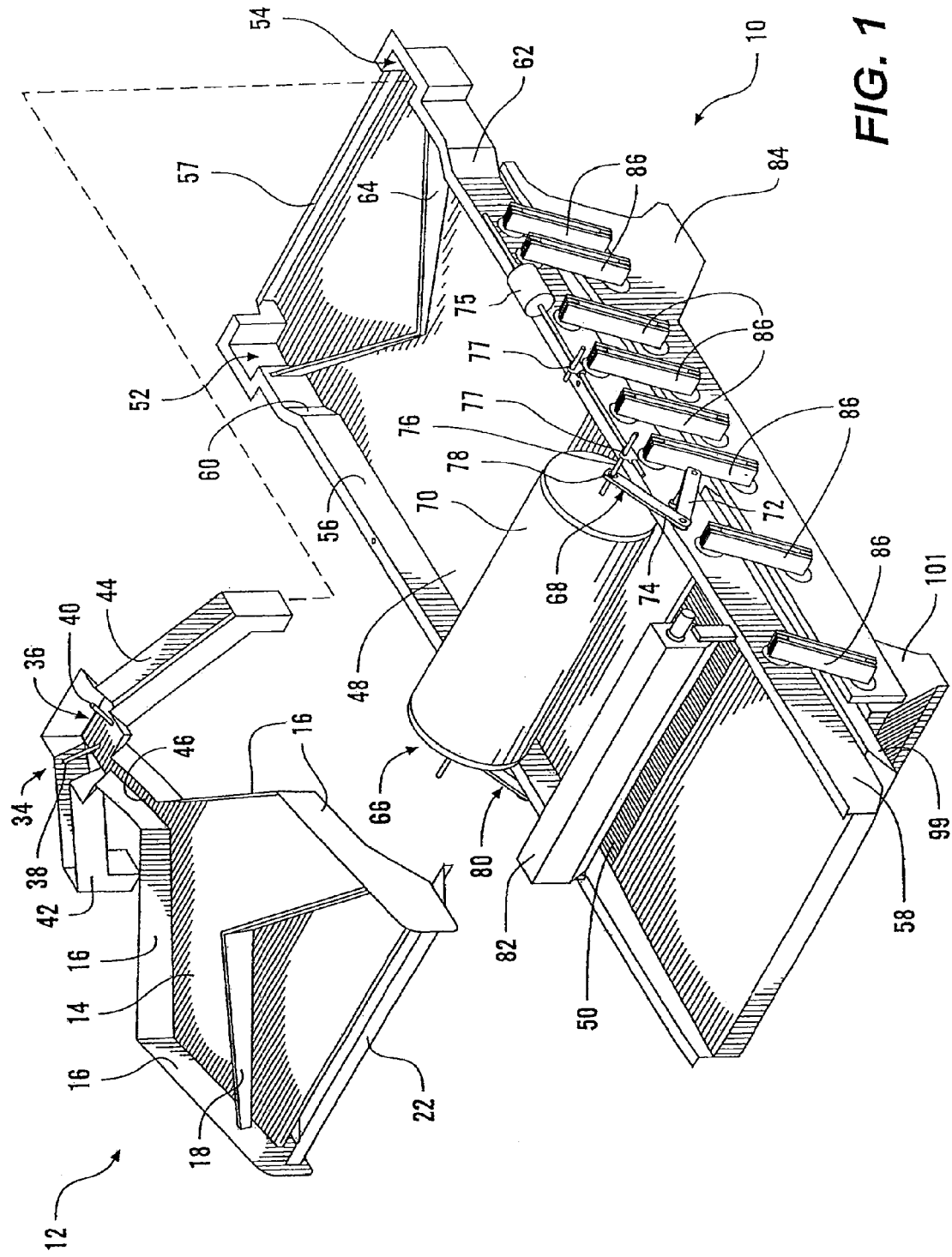
FIG. 1 is a perspective view of a first embodiment of the instant invention including an excited frame assembly and an upper elongate pan assembly, without the recycle assembly.

As shown in FIG. 1, a first preferred embodiment of the invention includes an excited frame assembly 10 and an upper elongate pan assembly 12. The upper elongate pan assembly is mounted to the excited frame assembly 10.

The upper elongate pan assembly 12 includes an upper pan 14 having sidewalls 16 to contain a coating, such as free-flowing aggregate breading. The assembly 12 further includes an upper transverse distribution means 18 preferably a tapered, angular, wall-like structure to facilitate distribution (i.e., transversely) of coating across the distal portion of the upper pan 14.

Figure 2:
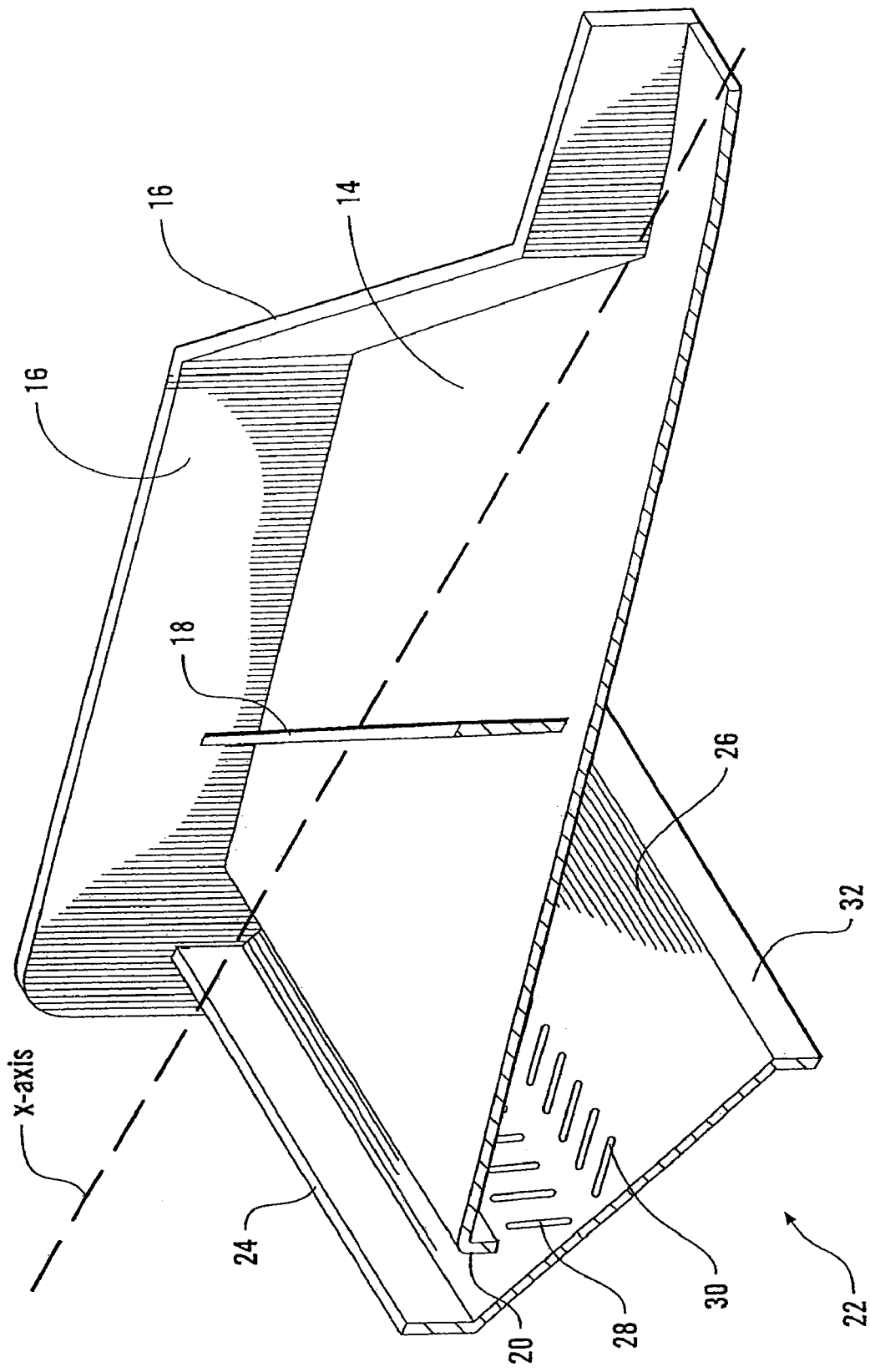
FIG. 2 is a cut-way perspective view of a portion of an exemplary upper elongate pan assembly.

As shown in FIG. 2, a lip 20 is located at the distal end of the pan 14 to facilitate transfer of the coating from the upper pan 14 to a waterfall distributor member 22. The waterfall distributor member 22 includes a proximal lip 24 to direct aggregate coating leaving the distal end of the pan 14 toward a distribution surface 26 of the member 22. The distribution portion 26 includes 2 rows of angular slots 28, 30 oriented in opposition to further facilitate transverse distribution of coating aggregate. The slots 28, 30 may be sized to accommodate various or particular free-flowing aggregate coatings. The member 22 also includes a distal lip 32 to facilitate movement of coating to the excited frame assembly 10.

As shown in FIG. 1, the upper elongate pan assembly 12 further includes a distributor subassembly 34 comprising a distributor 36 for receiving coating. The well 36 includes 2 prongs 38, 40 for breaking up unsuitably large clumps of coating that may form in the distributor 36 due to, for example, ambient moisture. The subassembly 34 further includes 2 channels 42, 44 for transferring coating from the distributor 36 to the excited frame assembly 10. The subassembly 34 still further includes a trough 46 for transferring coating from the distributor 36 to the upper pan 14 surface.

The excited frame assembly 10 includes a lower pan 48 having a screen 50 located in the distal portion of the lower pan 48. A transverse funnel 1001 and tray 99 (see also FIGS. 1 and 6) are mounted to the lower pan 48 under the screen 50 to funnel screened coating into a lower length 104 of a drag-chain recycle channel 106. The lower pan 48 further includes 2 sidewalls 56, 58 that further include angled sidewall members 60, 62, and a back wall 57. At the proximal end of the lower pan 48, 2 wells 52, 54 are positioned to accept the distal end of the respective channels 42, 44. A lower transverse distribution means 64, preferably a tapered, angular, wall-like structure, facilitates transverse distribution of coating across the proximal portion of the lower pan 48.

The lower pan 48 further includes a soft roller assembly 66 adapted to be rotationally actuated by 2 opposing ratchet assemblies 68 (opposing assembly 80 partially shown in FIG. 5) in clockwise rotation, which is desirable (as shown) to facilitate longitudinal movement of the coating and food products. The soft roller cylinder 70 is constructed from materials known in the art, and it pats coating applied to the top surface of the food products from the upper elongate pan assembly 12. Each of the opposing ratchet assemblies 68, 80 includes a first bracket 72 rotationally mounted to the sidewall 58 and rotationally mounted to a second bracket 74. The second bracket 74 is rotationally mounted to a shaft 76 which is fixed with respect to the soft roller 70. The shaft 76 is mounted to the side of the channel 108. (See FIG. 5) A ratchet 78 is incorporated in both ratchet assemblies 68, 80 within the mounting between the second bracket 74 and the shaft 76 to provide for clockwise actuation of the soft roller 70. A counter-weight 75 and mounting assembly 77 are provided to facilitate actuation of the ratchet assembly 68, 80.

Preferably, the ratchet 78 is one-way locking steel with needle-roller bearings. Actuation of the ratchet assembly 68 is provided by the vibrational movement of the excited frame 10. Another ratchet assembly 80 (shown partially in FIG. 1) is provided on the other sidewall 56. A transverse air manifold 82 is mounted to the sidewalls 56, 58 to blow loose coating from the top of coated food product onto the screen 50.

Figure 3:
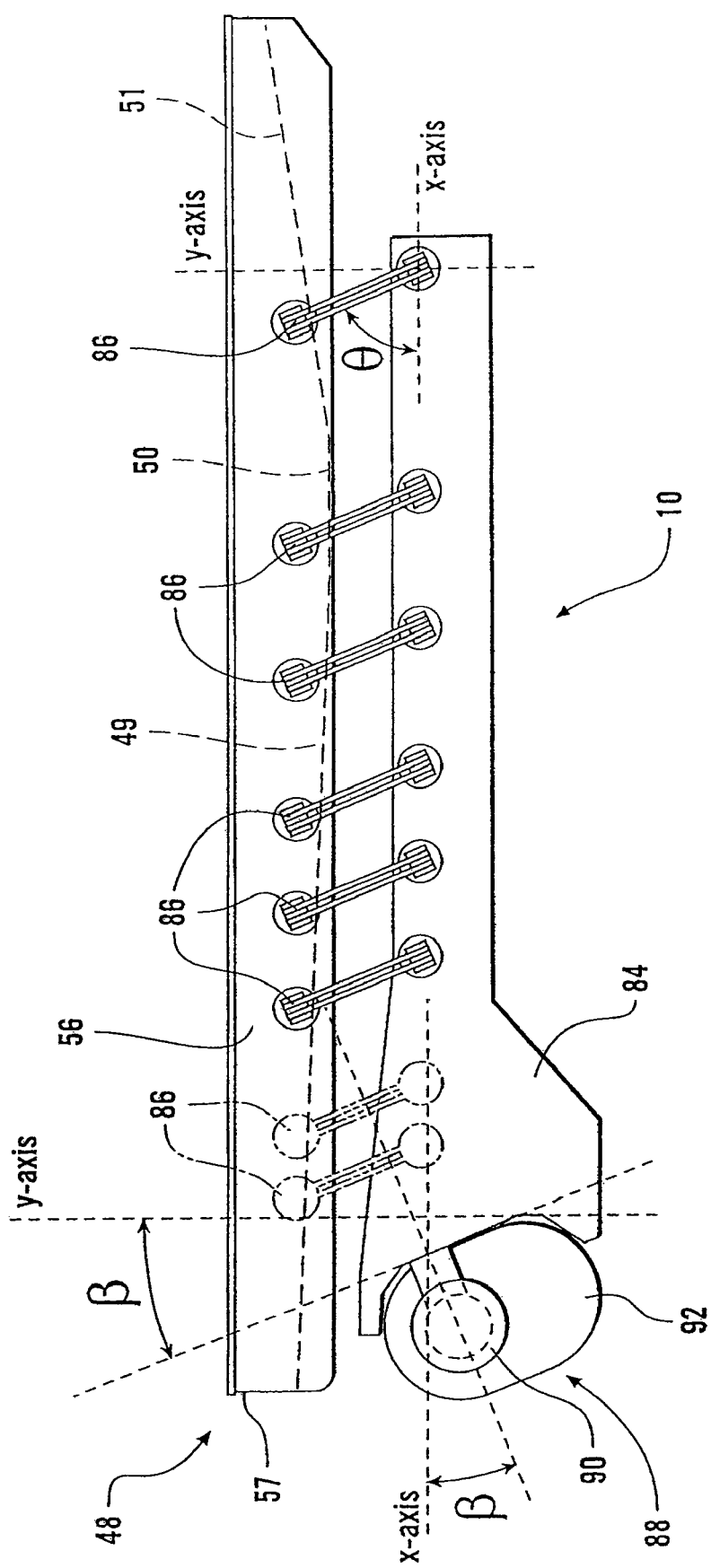
FIG. 3 is a side view of an exemplary excited frame assembly comprising the motorized vibratory assembly, the spring assemblies and the lower pan.

As shown in FIGS. 1 and 3, the excited frame assembly 10 further includes an excited frame 84 mounted to the sidewalls 56, 58 of the lower pan 48 by way of a plurality of parallelepiped arm spring assemblies 86. The lower pan 48 includes a declining bottom 49 between the back wall 57 and the proximal end of the screen 50. Preferably, the bottom 49 is at a decline in the range of 2 to 5 degrees (preferably 3°) below the horizontal x-axis. The lower pan 48 also includes an inclined bottom 51 between the distal end of the screen 50 and distal end of the lower pan 48. Preferably, the bottom 51 is at an incline in the range of 2 to 6 degrees (preferably 5°) above the horizontal x-axis. Preferably, the bottom of the lower pan 48 is declining to facilitate linear movement of the coating material, avoid stalling and avoid the need to operating at excessive frequency and amplitude. The bottom 51 is inclined sufficient to set the distal end of the bottom 51 at the desired height from the ground. Preferably, the screen 50 is horizontally level respecting the x-axis.

In a preferred embodiment shown in FIG. 3, each spring assembly 86 comprises 1 or 2 springs. The spring assemblies 86 are oriented at an angle θ above the x-axis. A line of force lies perpendicular to a line through the arm spring assemblies 86. The springs may be constructed from high performance composite materials, such as, but not limited to, E-glass/epoxy, carbon fiberglass/epoxy, (carbon/glass)/epoxy, fiberglass/polyester, and high temperature glass/epoxy in crossply, spring orientation and unidirectional (e.g., 80%) pre-preg constructions available from Composiflex, Inc., Erie, Pa. Spring design for various excited frame applications is found in product information entitled "Composite Springs" available from Composiflex, Inc.

For example, given a natural frequency ($F_n$ in cycles per minute) and pan mass (m in pounds-mass) (i.e., the total mass of the upper elongate pan assembly 12 and the lower pan 48 and attached components thereof), the sum of all the individual spring constants (ΣK in pounds per inch) is equal to the number of springs (assuming each spring has the same constant) multiplied by $(\pi F_n/30)^2(m/386)$. Thus, the spring constant for each spring is ΣK divided by the number of springs. In an exemplary embodiment, the spring constant is 280 pounds/inch, the width of each spring is around 2½ inches, the length of each spring is around 11 inches and the thickness of each spring is about ¼ inch. In terms of overall design, the spring constant is designed such that the operating frequency is 20-40% of $F_n$, and preferably around 33% $F_n$.

The excited frame assembly 10 further includes a motorized vibrator assembly 88 mounted to the excited frame 84. The motorized vibrator assembly 88 is adapted to impart energy to the excited frame 84 at an angle β below horizontal. In a preferred embodiment, the assembly 88 includes a motor 90 coupled to an eccentric vibrator and housing 92. The eccentric vibrator may be a QE Quadra-Eccentric Vibrator Model QE512-F available from Renold Ajax of Westfield, N.Y. or a pair of Rotary Electrics (see second embodiment).

Figure 4:
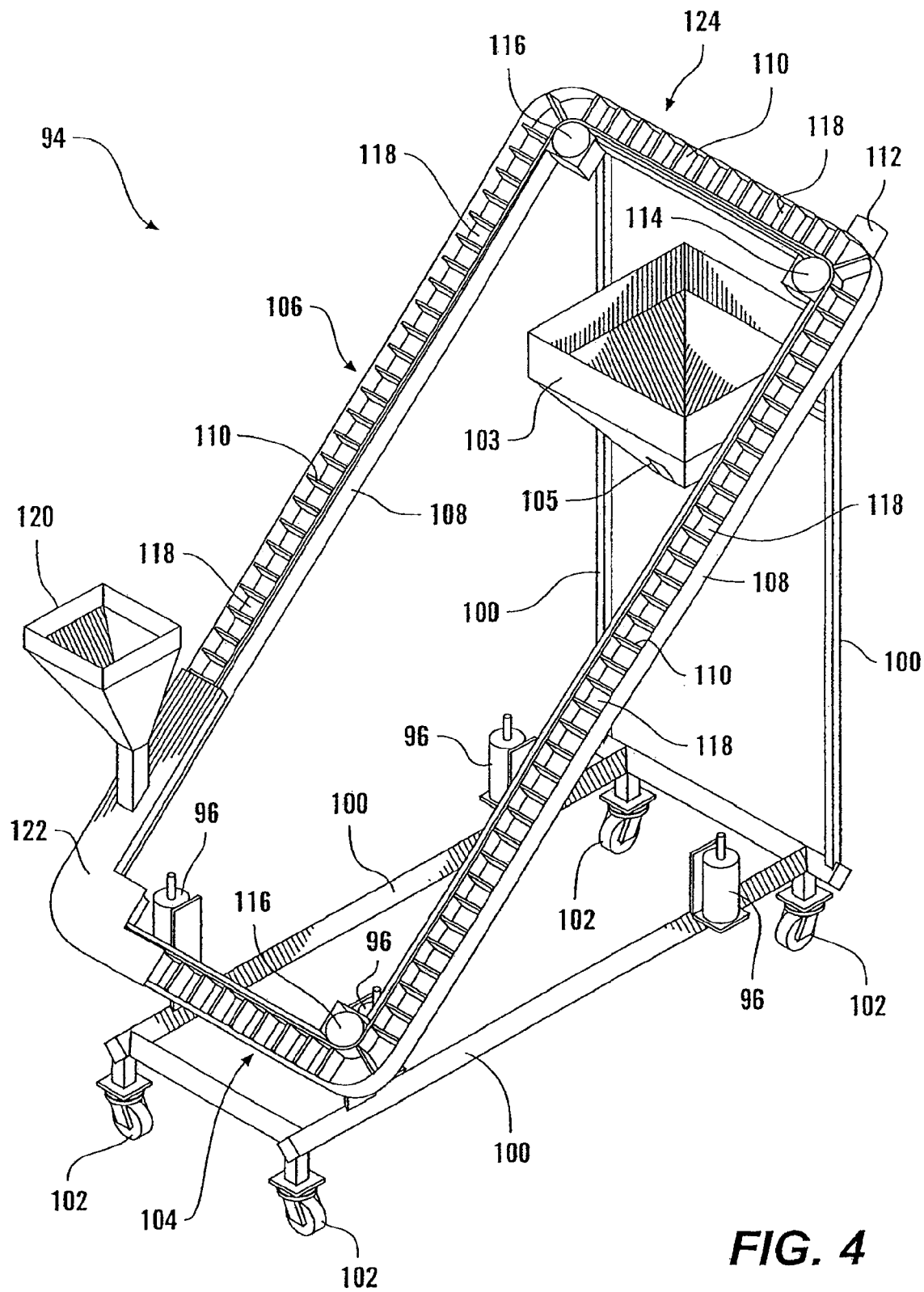
FIG. 4 is a perspective view of an exemplary coating recycle assembly.

Shown in FIG. 4 is an exemplary coating recycle assembly 94 which may be used to recycle coating screened by the screen 50 to the upper elongate pan assembly 12. The recycle assembly 94 is vibrationally-isolated from the excited frame assembly 10 by 4 dampners 96. The excited frame 84 is mounted to the dampners 96 using brackets 98 welded to the excited frame 84. (See FIG. 5) The dampners 96 are bolted to the recycle frame 100. Preferably, the dampner 96 is constructed from a polyurethane tube having a 2.5 inch thick wall, 6 inches in length, and 40-60 Durometer. The dampner 96 is also referred to as an isolator in the art. The recycle frame 100 has 4 shop casters 102 mounted thereon. The casters 102 may also be rail-type casters.

The coating recycle assembly 94 also includes a recycle hopper 103 mounted to the frame 100 and positioned such that recycled coating is funneled into the distributor 36. (See also FIG. 5) The recycle hopper 103 preferably includes adjustable openings 105 to regulate the flow of coating to the channels 42, 44 (not shown) and the trough 46. The drag-chain recycle assembly 106 includes a stainless steel channel 108 structure mounted to the frame 100. A baffled, drag-chain belt 110 is actuated through the channel 108 by a motor-driven 112 rotor 114. Three other blank rotors 116 facilitate actuation of the belt 110. The baffles define compartments 118 for handling coating material. An upper length 124 of the channel 108 has an opening (not shown) in the stainless steel channel 108 so that recycled coating falls into the recycle hopper 103.

The drag-chain belt 110 may be constructed from polypropylene, polyethylene, acetal, detectable polypropylene or the like. An exemplary drag-chain belt 110 is a Series 800 Open Hinge Impact Resistant Flight model available from Intralox, LLC of Harahan, La. A feed hopper 120 mounted to a channel cover 122 is provided to charge or feed coating into the recycle assembly 94.

Figure 5:
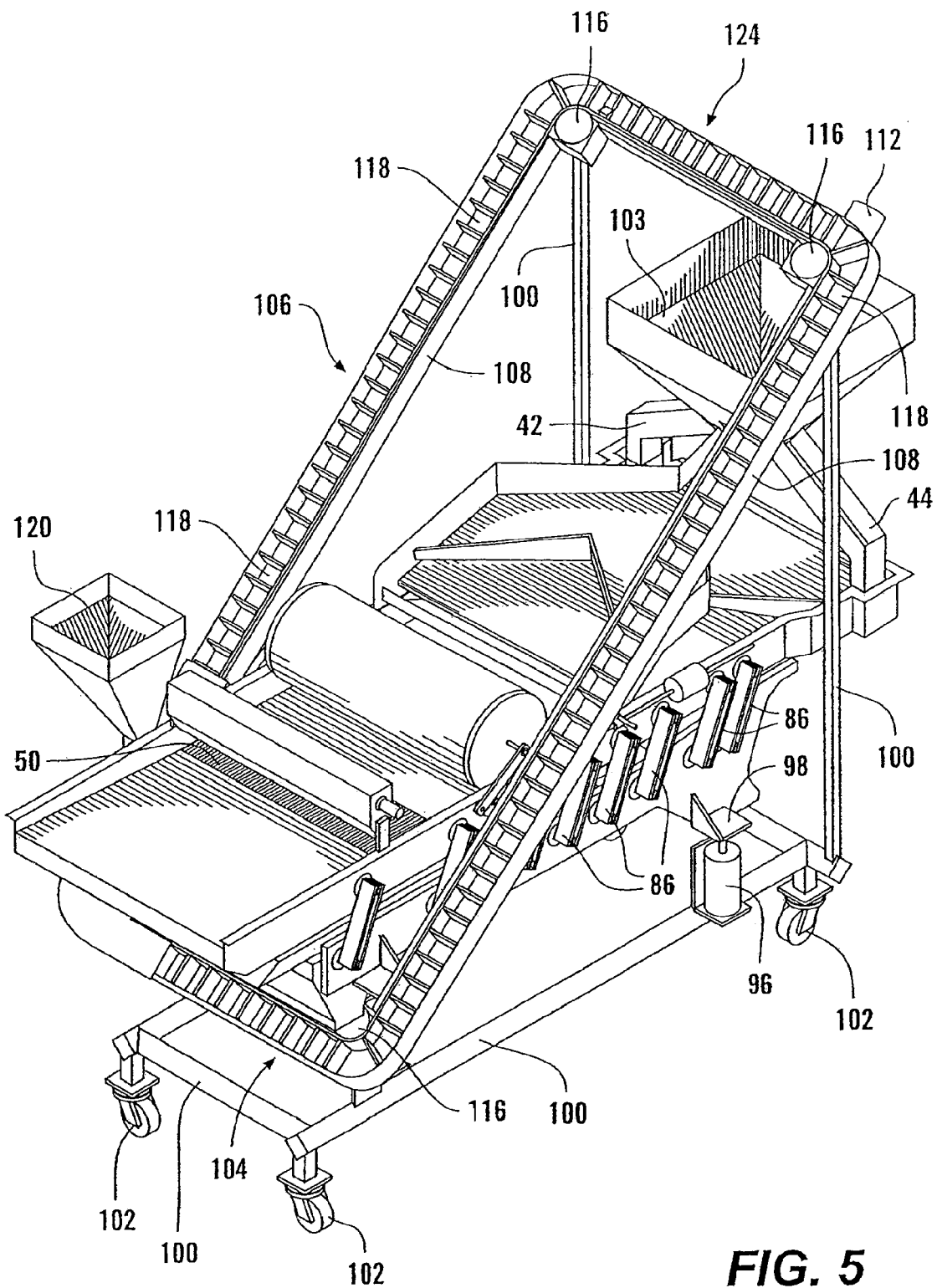
FIG. 5 is a perspective view of an exemplary embodiment of the instant invention including the excited frame assembly, the upper elongate pan assembly and the coating recycle assembly.

Shown in FIG. 5 is an assembled breader apparatus comprising the excited frame assembly 10, the upper elongate pan assembly 12, and the coating recycle assembly 94. The excited frame assembly 10 and upper elongate pan assembly 12 are vibrationally-isolated from the coating recycle assembly 94 by the dampners 96.

To begin operation, the motorized vibrator assembly 88 and recycle motor 112 are activated. The speed of the vibrator assembly 88 is adjusted to achieve a predetermined frequency and amplitude. Coating is charged into the feed hopper 120 which is distributed throughout the system. Preferably, food product is fed to the breader apparatus by placing it on a layer of coating in the lower pan 48 downstream from the transverse distribution means 64 and prior to an area where coating falls from the waterfall distributor member 22.

Figure 6:
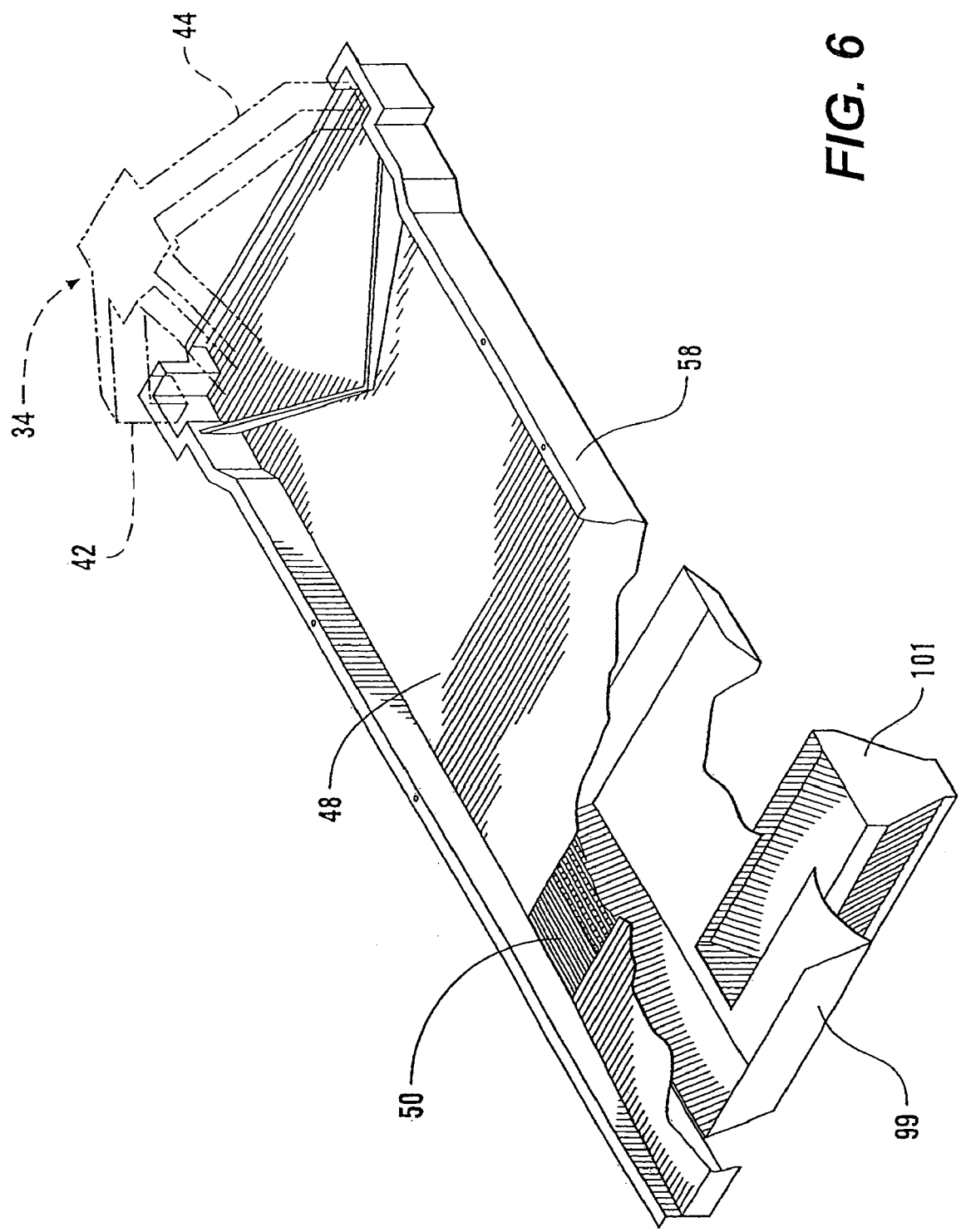
FIG. 6 is a partial cut-away perspective view showing an exemplary transverse funnel and tray assembly for funneling screened coating into the coating recycle assembly.

As shown in FIG. 6, coating screened by the screen 50 falls onto the tray 99 and transverse funnel 101. The tray 99 and transverse funnel 101 are resiliently mounted to the lower pan 48. The tray 99 is preferably tapered down toward the funnel 101 to direct screened coating into the funnel 101. Coating falling from the transverse funnel 101 is directed into the lower length 104 of the drag-chain recycle channel 106.

Construction and Operation of a Second Preferred Embodiment

Although the apparatus discussed above does not include a wire belt to convey food product and instead conveys food product by vibratory movement, it may be desirable to include a wire conveyor belt 326 to convey food product along the apparatus.

In addition, it may be desirable for the apparatus to not only coat food product with a coating, but also be capable of applying one or more topping to one or more sides of the food product, such as the topside of a food product. Such prepared food products include pizzas, pretzels, fish, cheese, fruit, vegetables, or other meat patties, and the like. The types of toppings used on these food products include cheese, mushrooms, sausage, sugar and cinnamon, spices, breadings, salt, and the like.

Toward this end, referring to FIG. 7, an apparatus 204 is illustrated that is identical to the apparatus of the first embodiment except in the ways described below. Elements of the apparatus of FIGS. 1-6 corresponding to elements of the apparatus of FIGS. 1-6 are, accordingly, designated by the same reference numerals, incremented by 200.

The apparatus 204 includes three conveying devices: a vibrating assembly 206 with a distribution hopper and pans, a wire conveyor belt assembly 398, and a coating recycle assembly 294. Although the coating recycle assembly 294 does not include the term topping in its name, it should be understood that topping could also be recycled by assembly 294.

The apparatus can be powered with hydraulic motors, electric motors, or a combination of the two. The illustrated apparatus includes an electric panel 325 for powering one or more electric motors. In one embodiment, the entire apparatus is powered with two drives, i.e., an electric or hydraulic drive for the coating recycle assembly and an electric drive for vibrating the vibrating assembly 206. In contrast, previous apparatuses required up to eight drives. An exemplary hydraulic motor that can be used to run the coating recycle assembly 294 and wire conveyor belt 326 is a Model 103-1420 hydraulic motor available from Eaton Corporation, or the like.

The Vibrating Assembly

Referring now to FIGS. 8-11, the vibrating assembly 206 includes an upper pan 214, a middle pan 324 including a back wall 334 and a lower pan 248, which includes 2 sidewalls 330, 332.

The upper pan 214 has a structure similar to the upper pan 14 of the first embodiment. The upper pan 214 includes an upper transverse distribution means 218.

Figure 13:
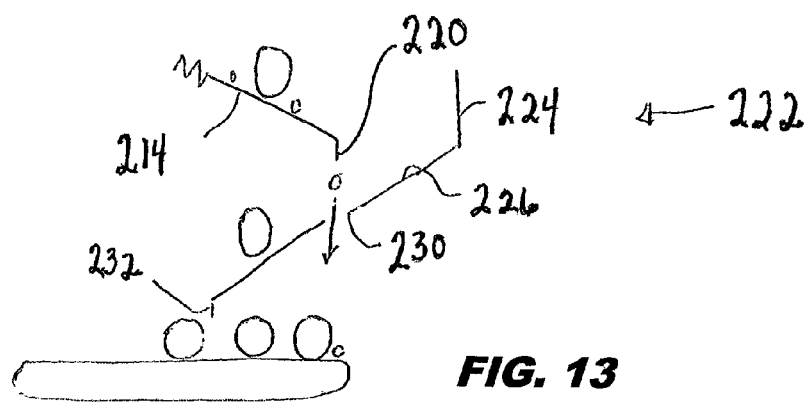
FIG. 13 is a close up view of a portion of FIG. 12 designated by the circle of FIG. 12.
Figure 12:
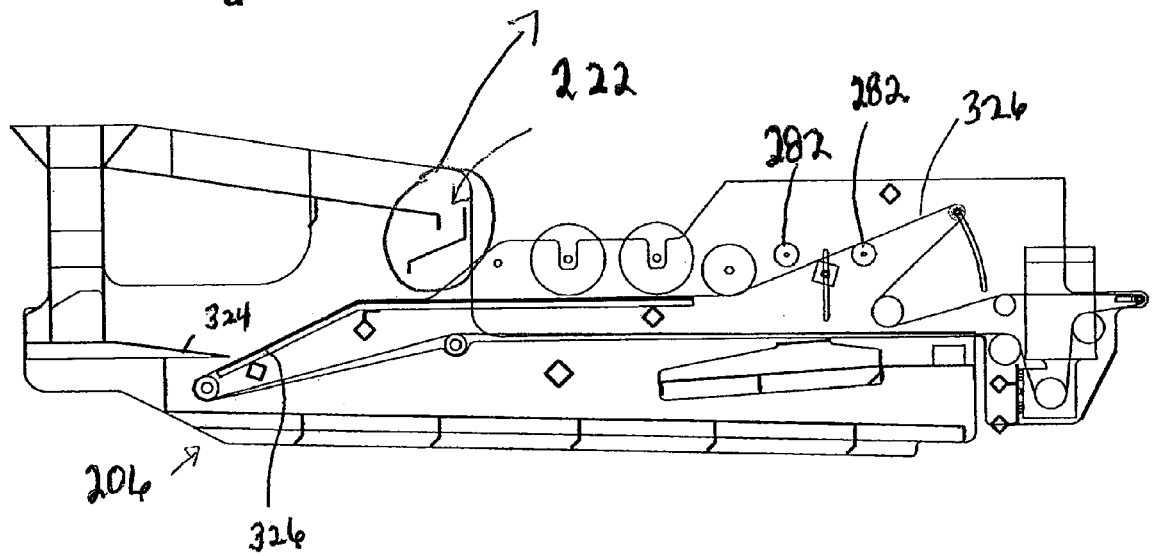
FIG. 12 is a side view of a portion of the vibrating assembly and the wire conveyor belt assembly of FIG. 7.

In addition, as is shown in FIGS. 12 and 13, the distal edge of the upper pan 214 includes a lip 220 is located at the distal end of the pan 214 to facilitate transfer of the coating from the upper pan 214 to a waterfall distributor member 222. Arrow a of FIG. 13 shows the direction of travel of food product being coated or topped. The waterfall distributor member 222 allows smaller pieces of coating and/or topping to fall through slots 228 (not shown) and 230 in the distribution surface 226 of the member 222. Larger pieces of coating and/or topping travel down the distribution surface 226, fall on food product before the smaller pieces fall on food product. The smaller pieces fill in gaps between larger pieces, resulting in more complete covering of food product with coating and/or topping.

The vibrating assembly 206 further includes a distributor subassembly 234 comprising a distributor 236 for receiving coating and/or topping. The well 236 includes 2 prongs (not shown) for breaking up unsuitably large clumps of coating and/or topping that may form in the distributor 236. The subassembly 234 further includes 2 channels 242, 244 for transferring coating from the distributor 236 to the middle pan 324 for sending coating to the wire conveyor belt assembly 398 for coating the underside of food product (where desired). The subassembly 234 still further includes a trough 246 for transferring coating from the distributor 236 to the upper pan 214 surface.

Figure 14:
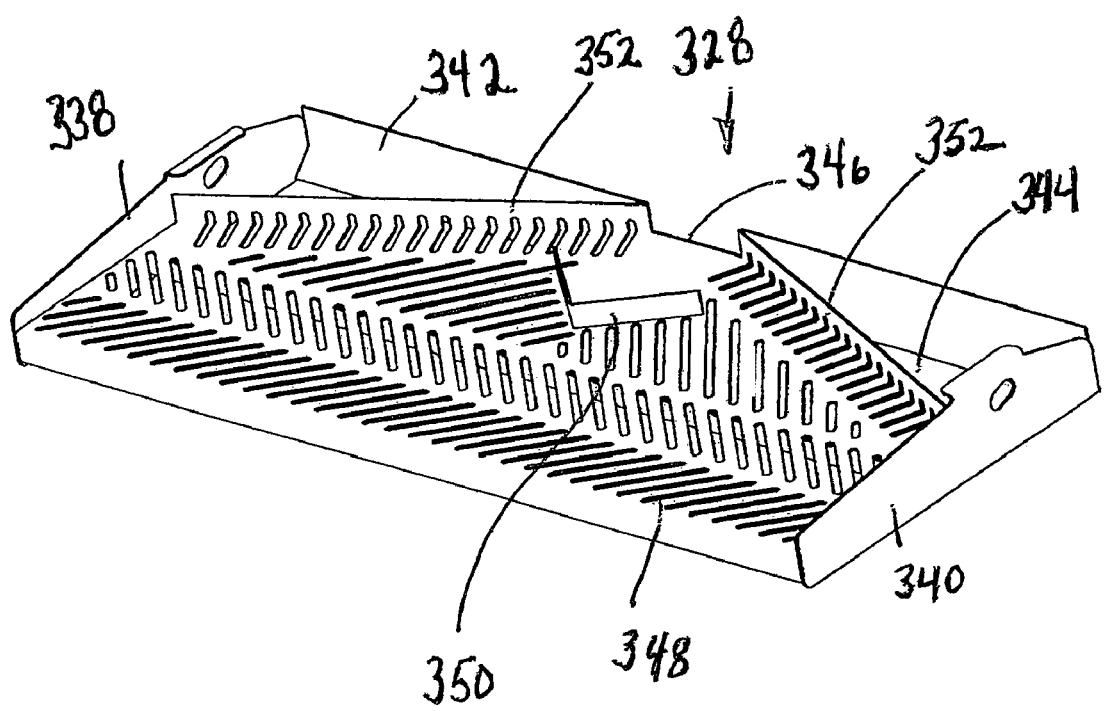
FIG. 14 is an isometric view of the scalping pan of FIG. 9.

The lower pan 248 includes a scalping screen 328 located in the distal portion thereof. As is best shown in FIG. 14, the scalping screen 328 includes sidewalls 338, 340, front wall 342, and bottom wall 344. The front wall 342 includes an opening 346 therein. The bottom wall 344 includes a series of angled slots 348 that permit smaller pieces of coating and/or topping to fall therethrough. The front wall 342 is contiguous with a pair of inner walls 352. The intersection of the front wall 342 and inner walls 352 defines side edges of the opening 346. A distribution structure 350, preferably an angular, wall-like structure, facilitates distribution of larger pieces of coating and/or topping toward a distal set of slots 348, which are formed partially in the bottom wall 344 and partially in the inner walls 352.

The scalping screen 328 separates larger pieces or aggregates of coating and/or topping from smaller pieces thereof. Vibrations drive larger pieces up the scalping screen 328 to the opening 346 in the front wall 342 thereof. The larger pieces pass through the opening 346 and can then be collected and discarded with a diagonal wall diverter 353 to a side discharge 347, if desired. Although the side discharge 347 is shown on one side of the apparatus, it could alternatively be located on the other side with the diagonal wall diverter 353 pointing the opposite direction. The side discharge 347 transfers the larger pieces to waste. Mixing of batter or other liquid and the coating and/or topping can cause larger pieces to form. The scalping screen 328 allows separation and removal of these pieces. The smaller pieces fall through the scalping screen 328 and fall off the distal end of a bottom pan 351, which is located under the scalping screen 328.

Referring back to FIG. 7, the vibrating assembly 206 further includes an excited frame 284 mounted to the sidewalls 330, 332 of the lower pan 248 by way of a plurality of parallelepiped arm spring assemblies 286. A portion of sidewalls 216 of the upper pan 214 is formed by sidewalls 330, 332 of the lower pan 248. Thus, vibrations imparted to the lower pan 248 are transferred to the upper pan 214 by this structure and by connection of channels 242, 244 of the subassembly 234 to the middle pan 324.

Figure 7:
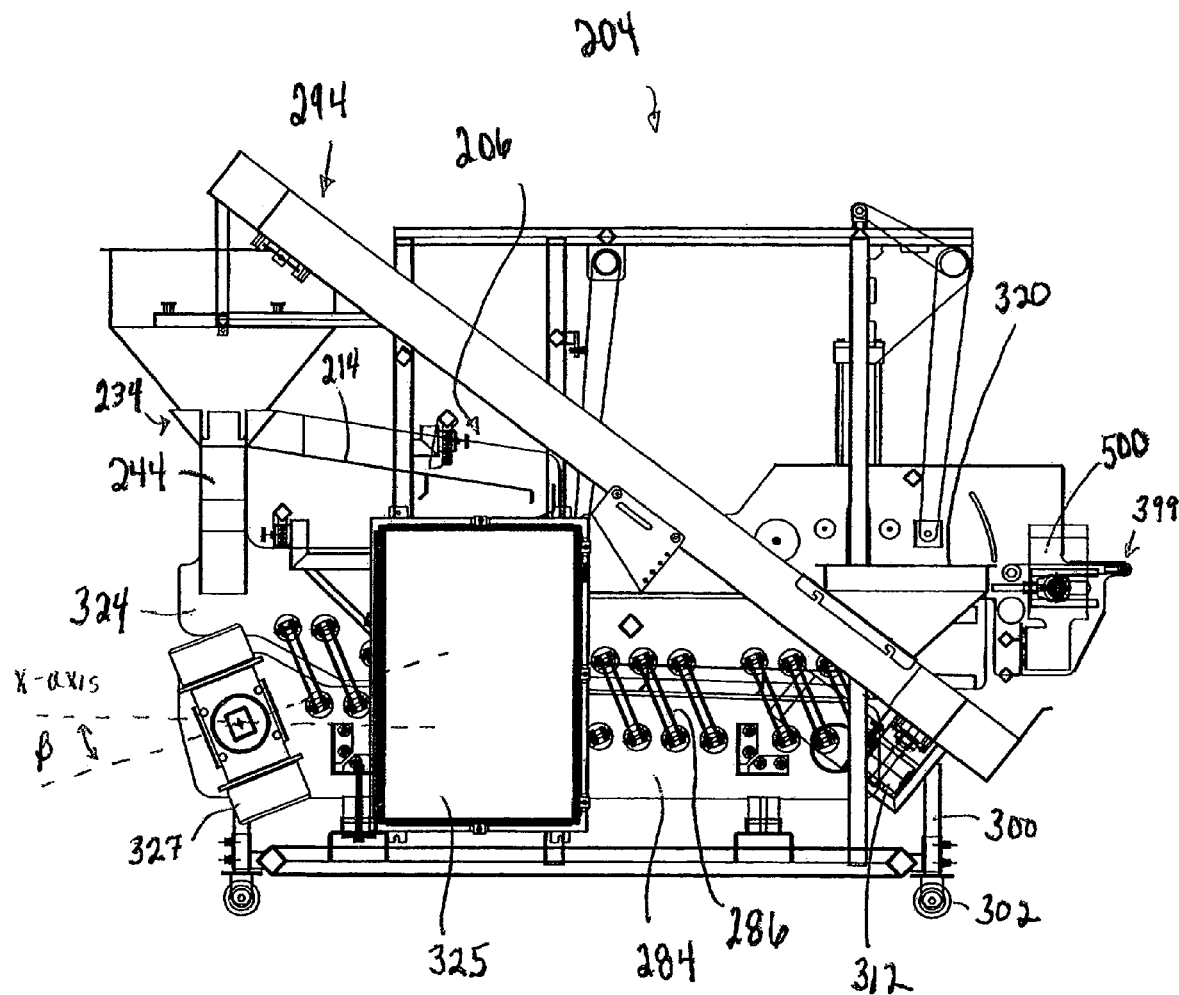
FIG. 7 is a side view of a second embodiment of the instant invention including a vibrating assembly, a wire conveyor belt assembly, and a coating recycle assembly.
Figure 8:
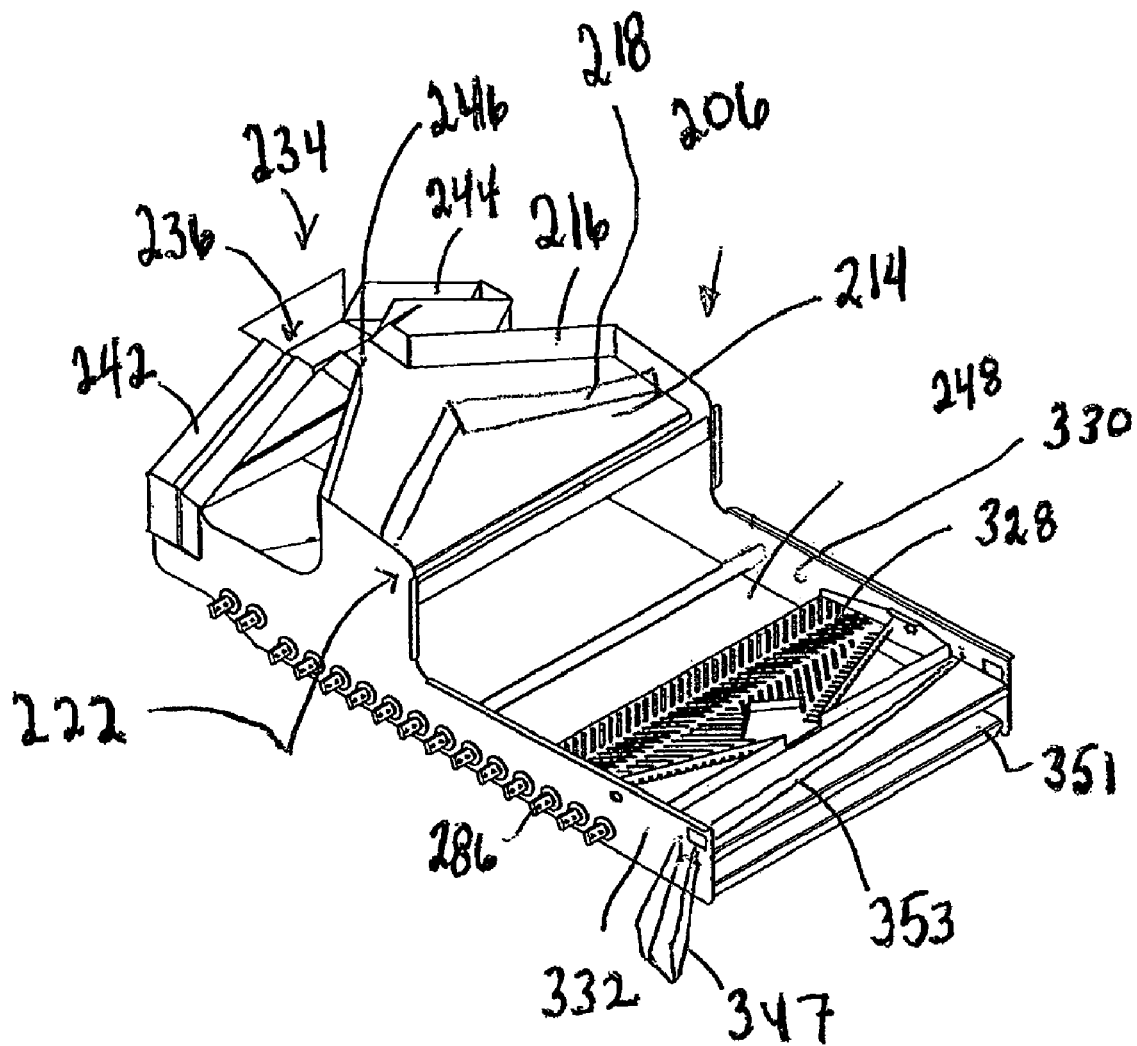
FIG. 8 is an isometric view of a portion of the vibrating assembly of FIG. 7.
Figures 9, 10, 11:
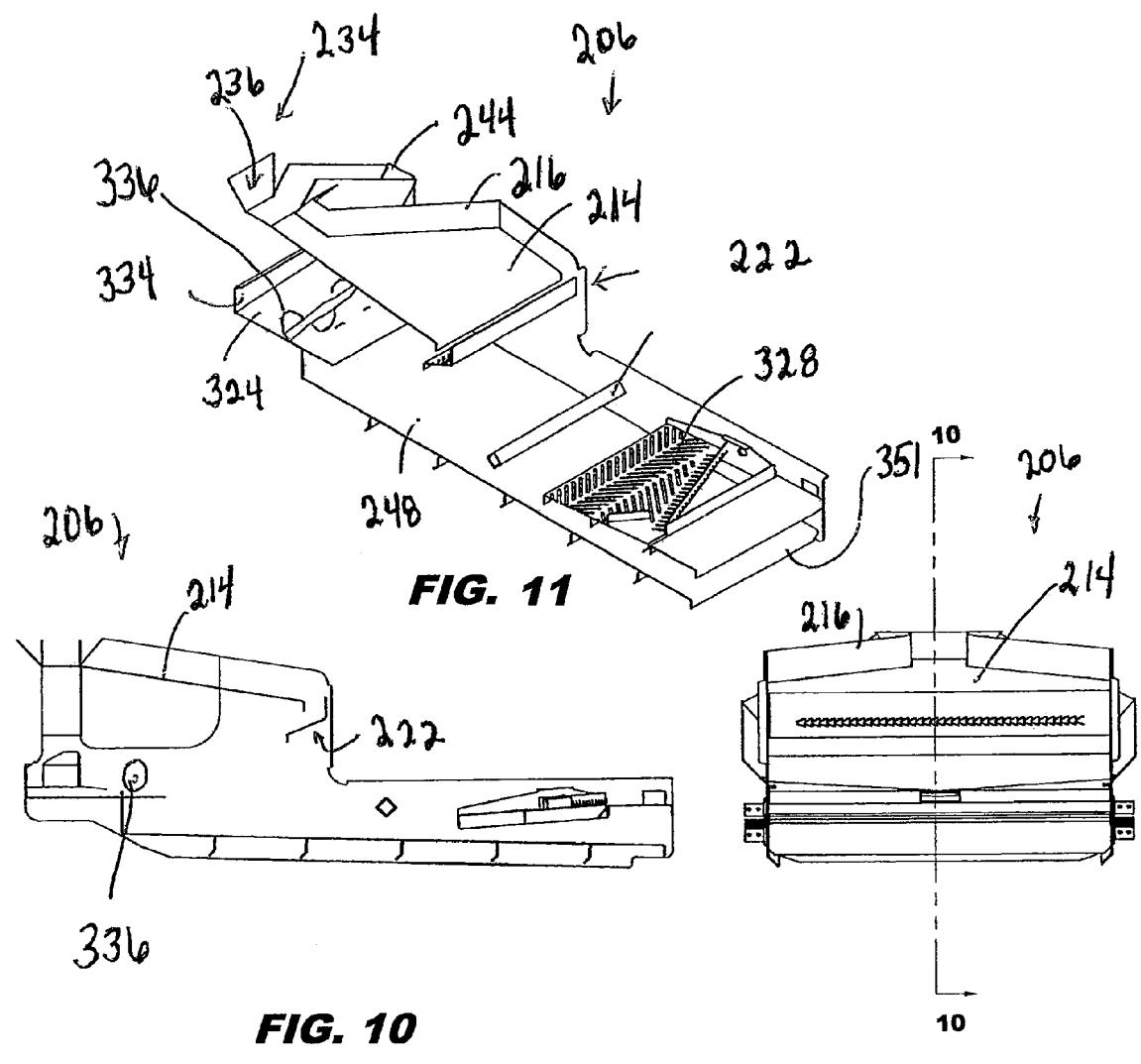
FIG. 9 is a front view of portion of the vibrating assembly of FIG. 8, showing an upper pan, a middle pan, a lower pan, and a scalping pan.
FIG. 10 is a cross-sectional view of FIG. 9 through line 10-10.
FIG. 11 is an isometric view of FIG. 10.

Still referring to FIG. 7, the vibrating assembly 206 further includes two vibratory drive units 327 mounted to the excited frame 284. The vibratory drive units 327 impart energy to the excited frame 284 at an angle β below horizontal. The vibratory drive units 327 may be Rotary Electric, Model RKBC 2-165-6 available from Renold of Westfield, N.Y., or single centered vibrator as called out on the first embodiment. In addition, the use of the two vibratory drive units 327 allows the wire belt to be inserted into the apparatus, as is shown in FIG. 12.

A cross conveyor 336 (FIGS. 10, 11) such as an auger, a pair of augers, a belt, or the like, can be included in the vibrating assembly 206 to further facilitate distribution of coatings or toppings along across the middle pan 324 to pull coatings or toppings to the center. Where a single auger is used, flights on opposite sides of the augers are oriented in opposite directions. An auger can be driven with a separate drive, e.g., a smaller Charlynn hydraulic motor or the like or an electric motor. Where a belt is used, an exemplary type is a wire a plastic belt, such as one made of polyurethane or another thermoplastic material. Such belts are available from Volta, e.g., SuperDrive, Karmiel, Ill. Where a cross conveyor 336 is used, it can be removable such that it is installed only when it is needed, e.g., for coatings and/or toppings that would benefit from it. A non-exhaustive list of such coatings and/or toppings include flour and Panko breading.

Figure 15:
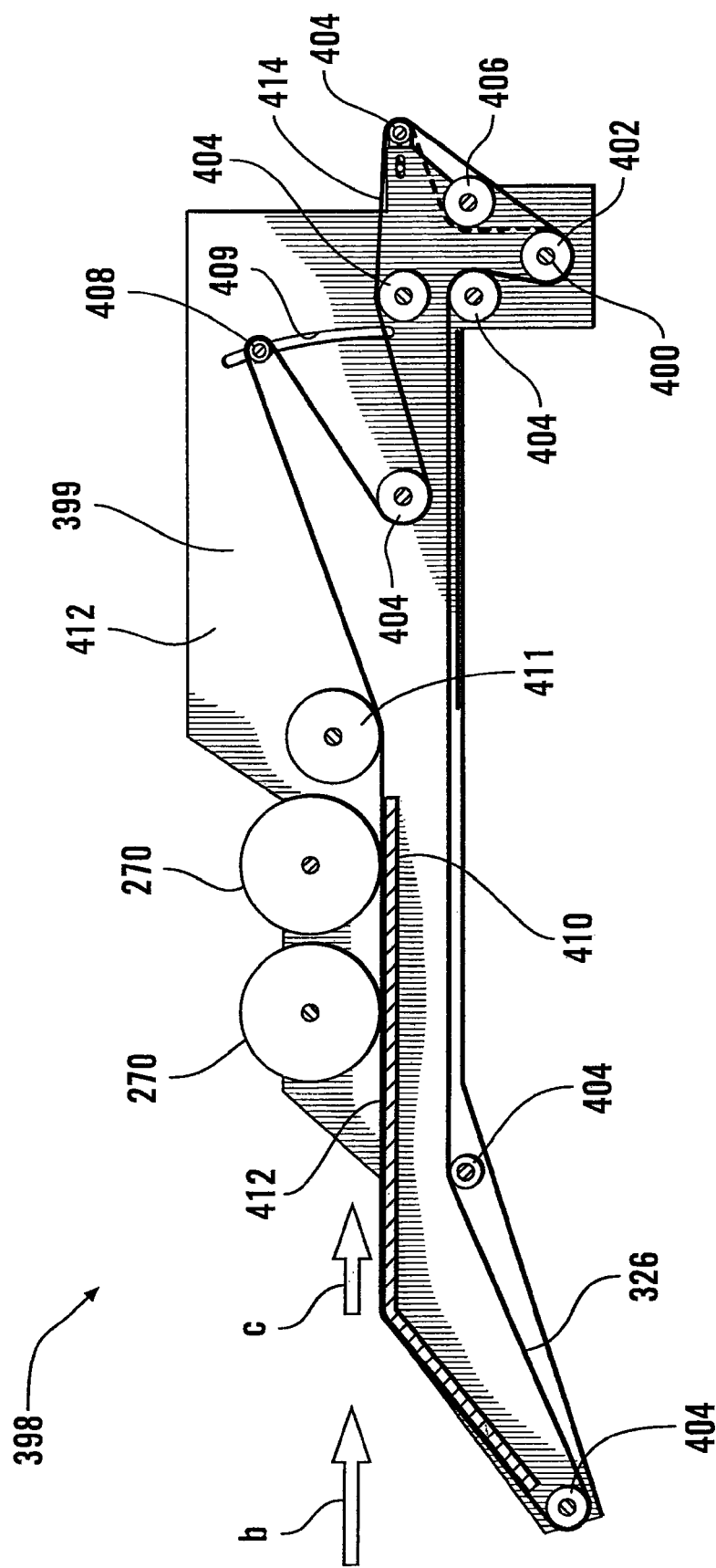
FIG. 15 is a side view of the wire conveyor belt assembly of FIG. 12.
Figure 16:
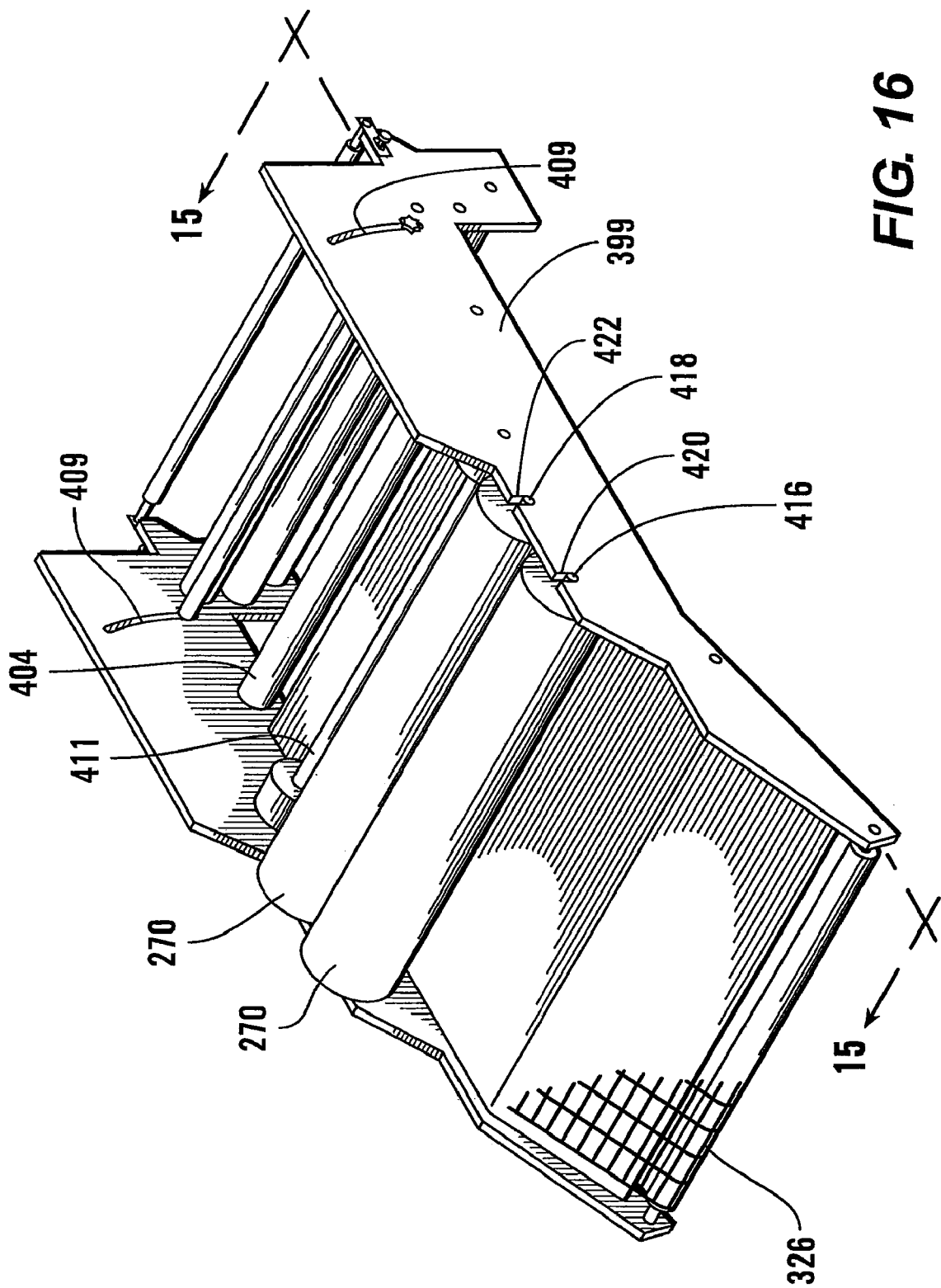
FIG. 16 is a perspective view of wire conveyor belt assembly of FIG. 15.

Referring now to FIG. 15, the also includes two (2) transverse air manifolds 282 that is mounted to the housing 399 to blow loose coating from the top of coated food product onto the scalping screen 328. Arrow b of FIG. 15 shows the direction of product in feed. Arrow c of FIG. 16 shows the direction of belt travel.

Wire Conveyor Belt Assembly

Referring now to FIG. 15, the wire conveyor belt assembly 398 includes the wire conveyor belt 326 and a housing 399 that receives the wire belt 236 The wire conveyor belt 326 is actuated by a drive shaft 400 including bearings 402. The wire conveyor belt 236 includes additional rollers 404 and a hold down roller 411 spaced throughout the belt 236 for altering the path thereof. One of the rollers 406 is adjustable in position to take up slack in the wire conveyor belt. In addition, a roller 408 is moveably received in an arcuate groove 409 of a sidewall 412 of the housing 399, as is described below. A belt support pan 410 is included underneath the wire belt conveyor 326 to temporarily retain coating for the underside of food product where desired.

The wire conveyor belt 236 includes an upper conveying surface 412 and a lower conveying surface 414. The arcuate groove 409 allows reorientation of the upper surface 412 with respect to the lower conveying surface 414 and thus, reorientation of the wire conveyor belt 326. Placing the drive shaft 400 at the upper end of the arcuate groove 409 results in food product moving off the upper conveying surface 412 and landing on the lower conveying surface 414 with the side of the food product that contacted the upper conveying surface 412 now being opposite the side of the product that contacts the lower conveying surface 414. That is, food product is flipped when it transfers from the upper conveying surface 412 onto the lower conveying surface 412. A benefit of flipping food product is that when coatings or toppings are lightweight and airy materials, such as flour, flipping food product removes unattached coatings or toppings.

In one embodiment, the wire conveyor belt 236 is a 24×0.072 Mesh (½" pitch) from Wire Belt Company of America of Londonderry, N.H. However, the wire conveyor belt 236 used in the apparatus can be of different size depending upon, among other things, the size of the food product conveyed on the belt. The wire conveyor belt 236 can have a width of 24 inches, 34 inches, 42 inches, or any other desired width.

Referring now to FIG. 16, in the illustrated embodiment, the apparatus includes two soft roller cylinders 270 having shafts 416, 418 that are received in grooves 420, 422 in the housing 399. The roller cylinders 270 push coating and/or topping onto the food product. The wire belt conveyor 326 allows elimination of the ratchet assemblies 68 that actuates the soft roller assembly 66 of the first embodiment. Instead, food product moving along the wire belt conveyor 326 actuates the soft rollers 270 to provide for rotary actuation thereof. However, if desired, ratchet assemblies such as the ratchet assemblies 68 of the first embodiment can be used.

The Coating Recycle Assembly

Figure 17:
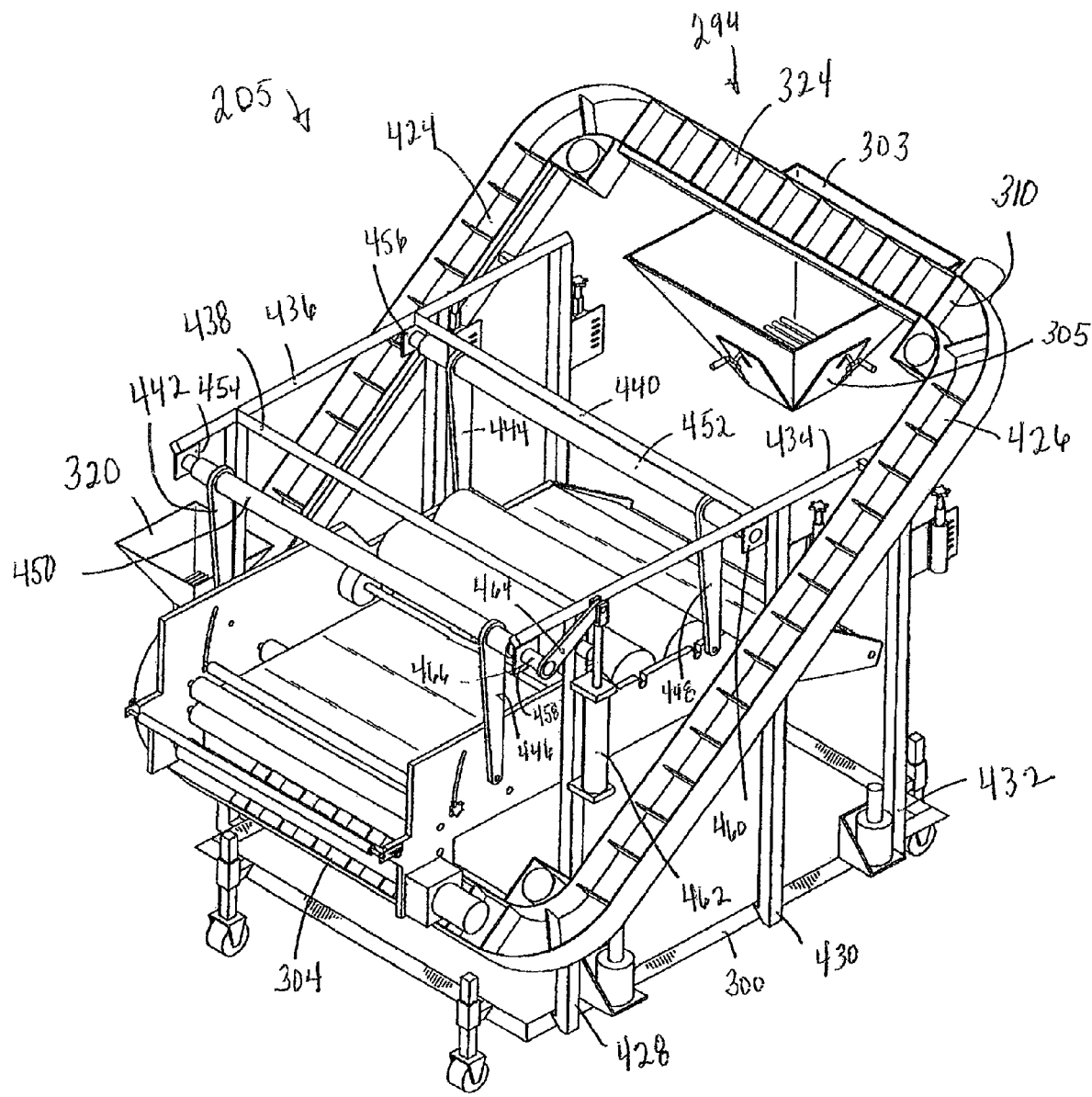
FIG. 17 is a perspective view of the second embodiment of the instant invention of FIG. 7.
Figure 18:
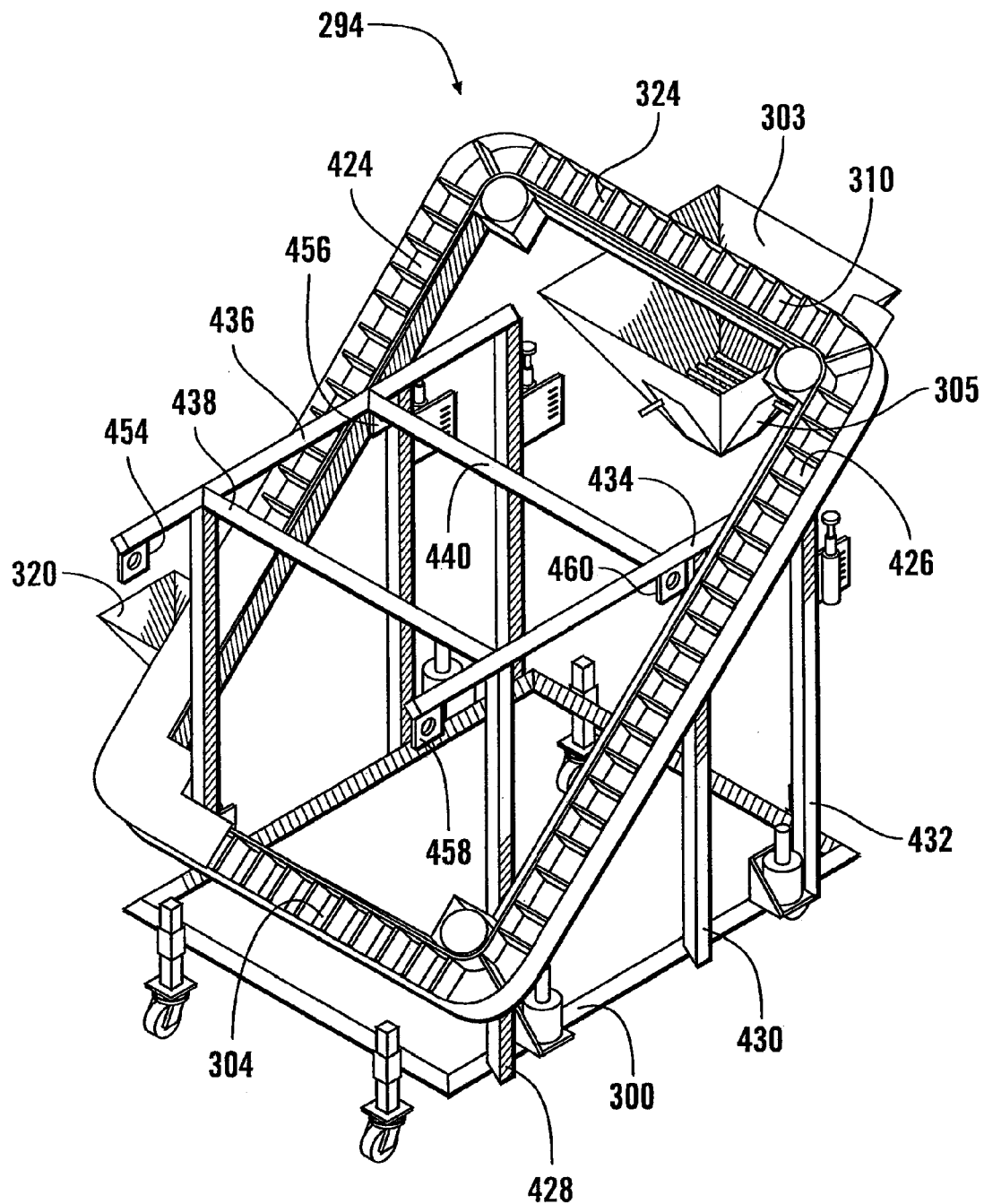
FIG. 18 is a perspective view of the coating recycle assembly of FIG.

Referring now to FIGS. 17 and 18, the coating recycle assembly 294 includes a recycle hopper 303 mounted to a frame 300 and positioned such that recycled coating is funneled into the distributor 236. The recycle hopper 303 preferably includes adjustable openings to regulate the flow of coating and/or topping to the channels 242, 244 and the trough 246. The drag-chain recycle assembly 106 includes a stainless steel channel 308 structure mounted to the frame 300.

In an embodiment, the drag-chain belt 310 of the recycle assembly 294 is a solid synthetic with tracking lugs (or drive cogs) on the back of the drag-chain belt 310 and flights on the opposite side. In one embodiment, the cogs are molded onto the back of the drag-chain belt 310. This provides the benefit of eliminating crevices, fissures, hinges or other structures where coatings and/or topping can become lodged and impede cleaning of the belt. An exemplary belt that can be used on the apparatus is a SuperDrive from Volta of Karmiel, Ill. Another exemplary belt that can be used on the apparatus is a plastic flighted a Series 800 Open Hinge Impact Resistant Flight model available from Intralox, LLC of Harahan, La. However, this belt is a segmented, plastic, modular belt that cannot be used in certain applications, such as dairy. When compared to a modular link style plastic belting, the solid synthetic belt provides the advantage of being easier to clean. The drag-chain belt 310 can be made of polyester thermal plastic or polyurethane or the like. The drag-chain belt 310 is four-cornered. In one embodiment, the flights are 6 inches by 6 inches. The flights are oriented such that free ends thereof point toward an outer edge of the stainless steel channel 308 structure.

One corner of the drag-chain belt 310 is driven by a sprocketed drive that engages the cogs, and the other three corners have 90 degree rollers, forming a conveyor rectangle. The sprocketed drive is received on a drive shaft having a square cross section where it engages the sprocketed drive. A snap ring captures the sprocketed drive onto the drive shaft. The drive shaft cross section transitions to a round cross section away from the sprocketed drive. An overhung load adaptor and a motor, such as a hydraulic motor are mounted on the drive shaft at this point for rotating the drive shaft. Previous apparatuses included multiple belts that were driven by multiple drives.

The conveyor includes an upper length 324, a lower length 304, an ascending portion 424, and a descending portion 426. The upper length 324 includes an opening (not shown) in the stainless steel channel 308 so that recycled coating falls into the recycle hopper 303.

Referring to FIGS. 17-18, this arrangement allows the coating recycle assembly 294 to pick up coating and/or topping discharged at the lower length 304 and return it to the upper length 324 via the ascending portion 424 of the drag-chain belt 310.

The drag-chain belt 310 provides the following advantages. Unlike a belt having two corners, the four corners of the drag-chain belt 310 permits the drag-chain belt 310 to be wrapped around a machine, such as the excited frame assembly 210 and upper elongate pan assembly 212, thereby saving plant floor space.

The flighted belt minimizes product damage and product spillage cause by previous recycle techniques. In previous apparatuses, coating and/or topping was moved from one belt to another or from one auger to another, leading to damage and spillage of coating and/or topping, both of which cost plants money and time.

The drag-chain belt 310 conveys coating and/or topping in three directions, i.e., collection along the lower length 304, elevation along the ascending portion 424, and distribution along the upper length 324. Previous conveyors only elevated coating and/or topping.

The drag-chain belt 310 can be made from material that is easily cleanable, maintained, and moveable as a single item. Previous belts were made from materials lacking these qualities and oftentimes were made from multiple pieces.

The frame 300 differs from the frame 100 in that it includes distal vertical members 428, intermediate vertical members 430, and proximal vertical members 432, whereas the frame 100 only includes proximal vertical members. In addition, the frame 300 includes upper side members 434, 436 and upper transverse members 438, 440.

Referring to FIG. 17, the wire conveyor belt assembly 398 is suspended inside of the vibratory assembly 206 by the frame 300 such that it is isolated from the vibratory assembly 206. The wire conveyor belt assembly 398 is suspended with qty. 4 arms 442, 444, 446, 448, which are hinged at both the frame 300 and at the wire conveyor belt assembly 398. At the frame 300, the arms 442, 444, 446, 448 are hinged at ends of transverse supports 450, 452, which are supported on the upper side members 434, 436 at brackets 454, 456, 458, 460, respectively. The arms 442, 444, 446, 448 have a geometry that allows the wire conveyor belt assembly 398 to swing out of the vibratory assembly 206 without making contact therewith. The swinging motion can be powered by a hydraulic cylinder 462, pneumatic cylinder, or the like. The hydraulic cylinder 462 is connected to a torque arm 464 and then to a shaft 466 that makes up one of the upper hinge points. The shaft 466 transmits torque into one set of the arms 442, 446 to create a swinging motion that swings the wire conveyor belt assembly 398 away from the vibratory assembly 206 for cleaning and maintenance. The motion could also be accomplished using a rotary actuator, an electromechanical jack, or similar devices.

In one embodiment, the apparatus is used only to apply toppings to the topside of food product. The coating recycle assembly 294 is either not included in the apparatus or it is, but it is not used. However, recycle assembly 294 can be used if desired. In this embodiment, the channels 242, 244 are either not included or they are not used, such as by closing them. A non-limiting, exemplary example of a use of such an apparatus is for topping pizzas. For this, the excited frame assembly 210 and the upper pan assembly 212 do not need to be vibrated. The wire conveyor belt 326 moves the pizza along the apparatus. Toppings, such as cheese, pepperoni, and sausage, are applied with a fork-like spread that is described in U.S. Pat. No. 4,248,173, which is incorporated herein in its entirety.

To begin operation, the vibratory drive units 327, the recycle motor 312 and the wire belt motor 500, which drives shaft 400, are activated. Coating and/or topping is then fed in hopper 320 where it is carried by the drag chain 310 up the ascending portion 424 and across the upper length 324 of the recycle assembly 294. It is then deposited into hopper 303 through an opening in the center of the upper portion of channel 308. The coating and/or topping flow is then metered out of hopper 303 by adjustable openings where it is directed into distribution channels 242, 244, and trough 246. Channels 242 and 244 carry and deposit substantially equal amounts of coating and/or topping onto each side of the middle pan 324. This coating and/or topping is then spread across the width of the middle pan 324 by the use of a transverse distribution means (not shown) and/or with the assistance of a conveying device such as auger 336. This spread coating and/or topping is then carried forward by the vibratory action and is transferred onto belt 236. It is retained above the belt by the belt support pan 410.

Coating and/or topping which was discharged from hopper 303 into the upper distribution trough 246 is carried to the upper pan 214 were it is evenly spread by the upper transverse distribution means 218. The coating and/or topping is then run over the waterfall distributor member 222. The coating and/or topping then falls onto the food products which were deposited onto a layer of coating and/or topping being carried by wire conveyor belt 236 from the middle pan 324. The wire conveyor belt 236 then carries the coating and/or topping and products under cylinders rollers 270. At this point, belt support pan 410 ends and the excess coating and/or topping is allowed to drop through the wire conveyor belt 236 to scalping screen 328. Excess coating and/or topping which is carried on top of the food product is then blown off by two air manifold 282 and/or dislodged by flipping of food product from the upper conveying surface 412 to the lower conveying surface 414 of the wire conveyor belt 236. Wire conveyor belt 236 continues to carry the now coated and/or topped food product to the discharge of the apparatus.

The excess coating and/or topping which as fallen through the belt 236 and landed upon scalping screen 328 is now sifted due to the vibratory motion transmitted to it through sidewalls 322. The smaller fine crumbs fall through the sifter slots onto pan 248 were they are carried to the front of the machine and deposited into the lower section of the recycle conveyor 310. The coating and/or topping is then dragged by belt 310 inside of the trough to be deposited into hopper 303 again.

The larger pieces that are not able to fall through the slots 348 in scalping screen 328 are then collected at front of the machine and discharged out of one of the ports in sidewalls 322.

Additional advantages of the apparatus include, but are not limited to the following. The coating and/or topping can be transferred and spread using only three conveying devices, i.e., the vibrating pan, the wire belt conveyor, and the recycle assembly 294. In contrast, previous apparatuses required six or more conveying devices to transfer and spread coatings and/or toppings. The use of the vibratory pan eliminates the need for cross feed augers and large distribution augers.

In addition, the apparatus costs less to assemble and operate due to the relative simplicity of the equipment, the reduced number of drives, reduced breading degradation, and the ease of sanitation.

An apparatus having a wire conveyor belt 326 is advantageous because it increases the speed at which food product can move through the apparatus. In one embodiment, food product is conveyed at speeds less than or equal to 100 feet per minute (fpm), such as 60 fpm. In another embodiment, food product is conveyed at speeds less than or equal to 200 fpm. In addition, food product can be conveyed at speeds substantially equal to the food product conveyance speed of upstream food processing equipment, such as batter applicators, which oftentimes also include wire conveyor belts.

It also permits set spacing of food product going through the apparatus. This preserves the spacing of food product from upstream processes, such as batter applications. In contrast, vibrational conveyance of food products results in random spacing of food products. Preservation of food product spacing reduces or eliminates marriages of food products. Marriages have the undesirable effect of producing an uncoated portion of a food product where two or more food products touch. Not only does this result in a bad looking food product, the uncoated portion of a food product can result in more serious effects, such as leakage of food product during a frying process, resulting in bad food product and contamination of fryer oil. The uncoated food product can even produce fryer fires.

Additional advantages of including a wire belt conveyor 326 in an apparatus include eliminating food products from sticking to a vibratory pan that conveys food product in other embodiments and previous apparatuses.

While this invention has been described in conjunction with the exemplary embodiment outlined above, various alternatives, modifications, variations, improvements, and/or substantial equivalents, whether known or that are or may be presently unforeseen, may become apparent to those having at least an ordinary skill in the art. Accordingly, the exemplary embodiments of the invention as set forth above are intended to be illustrative, not limiting. Various changes may be made without departing from the spirit and scope of the invention. Therefore, the invention is intended to embrace all known or earlier developed alternatives, modifications variations, improvements and/or substantial equivalents.

What is claimed is:

1. An apparatus comprising:
   a first frame;
   spring assemblies;
   a vibrating assembly including an upper pan, a middle pan, a lower pan, and a second frame mounted to the lower pan with the spring assemblies, the second frame being an excited frame and the upper pan, the middle pan, the lower pan being vibrationally connected;
   a vibratory drive unit mounted and adapted to impart energy to the second frame; and
   a wire conveyor belt assembly including a wire conveyor belt, and a housing that receives the wire conveyor belt, the wire conveyor belt assembly being suspended inside of the vibratory assembly by the first frame such that the wire conveyor belt assembly is isolated from the vibratory assembly.

2. The apparatus of claim 1, further comprising a recycle assembly including a recycle hopper mounted to the first frame.

3. The apparatus of claim 1, wherein the upper pan includes a transverse distribution means.

4. The apparatus of claim 1, wherein the vibrating assembly comprises:
- a distributor subassembly comprising:
- a distributor,
- channels that connect the distributor to the middle pan, and
- a trough that connects the distributor to the upper pan.

5. The apparatus of claim 1, wherein the lower pan comprises a scalping screen located in a distal portion of the lower pan, the scalping screen comprising:
- sidewalls;
- front wall;
- bottom wall, wherein the front wall includes an opening therein, wherein the bottom wall includes a series of angled slots formed partially in the bottom wall and partially in the inner walls, wherein the front wall is contiguous with a pair of inner walls, the intersection of the front wall and the inner walls defining side edges of the opening; and
- a distribution structure comprising an angled, wall-like structure arising from the bottom wall.

* * * * *